Aug. 26, 1941.   F. E. HEATWOLE   2,254,143
ACCESSORY
Filed May 15, 1939
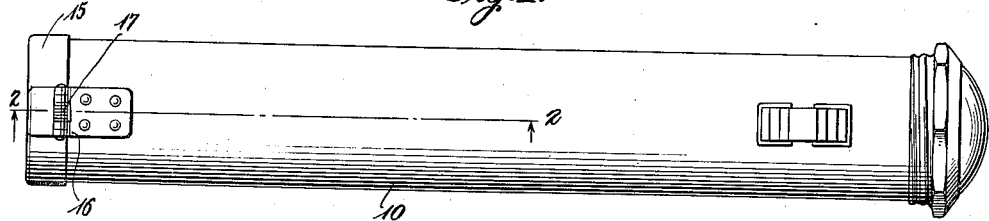
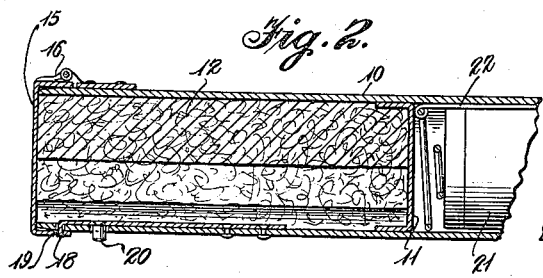   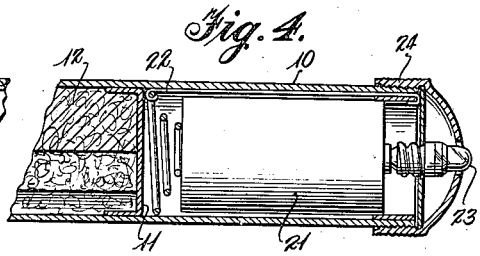
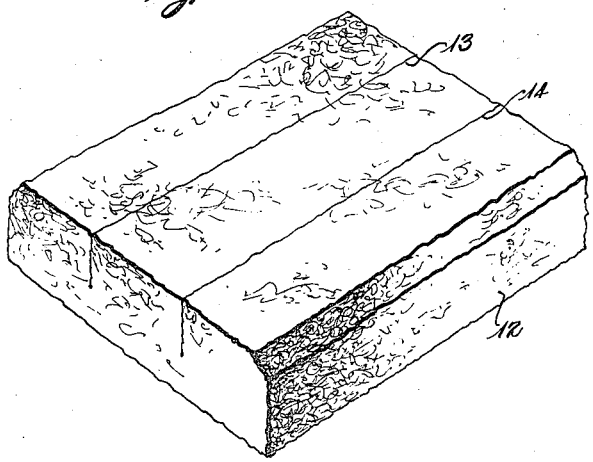   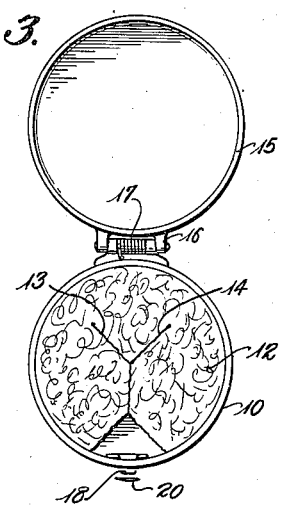
Inventor
Floyd E. Heatwole
By Stevens and Davis
Attorneys Patented Aug. 26, 1941

2,254,143

UNITED STATES PATENT OFFICE 2,254,143

ACCESSORY

Floyd E. Heatwole, Arlington, Va.

Application May 15, 1939, Serial No. 273,765

2 Claims. (Cl. 15—210)

This invention relates to an automobile accessory designed for the purpose of wiping the metallic strip normally used for measuring the depth of oil in the crank case of an automobile motor. More particularly, the invention has reference to a cleaning device for the oil gauge in combination with a flashlight, preferably within a unitary, tubular case.

It is common knowledge that the oil gauge employed in connection with a motor of a modern automobile consists of a strip of metal having a handle at one end and engraved indicia on the face of the metal near the end opposite the handle for measuring the depth of oil in the crank case of the motor. The gauge is inserted into the body of oil in the crank case through an opening of relatively small size in the side of the engine block. In measuring the quantity of oil within the crank case, the gauge is withdrawn and wiped clean with a cloth, re-inserted into the engine block to the fullest possible extent and withdrawn. As the gauge member is drawn from the oil it retains an oily film which clearly indicates the depth to which the gauge has penetrated the body of oil. By noting the height of the oil film on the gauge the operator is able to determine accurately how much oil the crank case contains.

As noted above, it is a common expedient to wipe the oil gauge with a cloth and a service station attendant usually carries such a cloth in his pocket for that purpose. Those who have not had first hand experience with such practices will readily understand that the cloth employed to wipe the oil gauge rapidly becomes very soiled and very greasy; while service station attendants are even more aware of the ojectionable nature of such a cloth. The attendant carries in a hip pocket, a greasy, dirty cloth which soils the seat of his overalls and leaves greasy marks on various objects with which he comes into contact, such as the upholstered seat of an automobile.

A further difficulty with this method of gauging the depth of oil in a crank case is that manipulation in the dark is a rather complicated and difficult procedure. The oil gauge hole in the side of the engine block is generally well below the level of the hood sill and is therefore in shadow. The modern tendency has been to lower the engine block and raise the lower edge of the hood opening, thereby accentuating the shadow about the lower part of the engine block. Because the hole through which the gauge must be inserted is rather small, an attendant working in a dark place or at night must use a flashlight in order to be able to manipulate the gauge in determining the depth of oil in the crank case. After the gauge has been withdrawn it is necessary to lay down the flashlight, pick up a cloth, wipe the oil gauge clean and again pick up the light in order to be able to re-insert the gauge in the opening provided for that purpose.

The present invention provides a device for cleaning the oil gauge, which device may be carried in the pocket of the operator's clothing or laid down on any desired spot without soiling fabrics with which it comes in contact. The present new and useful accessory also obviates the difficulties encountered when gauging oil depths in the dark by providing a single, unitary, tubular container enclosing a means for projecting light upon the oil gauge opening and a means for cleaning the oil gauge itself without danger of soiling other articles by contact with the cleaning means.

Other objects and advantages of this invention will be apparent from the following detailed description when considered in connection with the attached drawing, wherein:

Figure 1 is a side elevation of one embodiment of the invention;

Figure 2 is a partial section of line 2—2 of Figure 1;

Figure 3 is an end view of the device shown in Figure 1 with the cover of the cleaning means open illustrating the nature of the gauge cleaning device;

Figure 4 is a partial cross-section through one end of an embodiment of the invention employing a modified type of light source; and Figure 5 is a pad of material suitable for the gauge cleaning element.

As a preferred embodiment the invention contemplates a container 10 which may be of any desired shape, although it has been found that ease of manipulation is best achieved by employing a container of generally tubular shape. Although the container is shown here as being round in cross section, it will be readily understood that it may be of square, hexagonal, octagonal or any other desired cross-section and may be fitted with ribs or grooves for any desired ornamental or useful purpose. A partition 11 is disposed within the container perpendicular to the length thereof in order to divide the same into a cleaning chamber and a lighting chamber. The length of the two chambers will depend upon the nature of the elements disposed within the container and the position of the partition 11 for any desired form of the present accessory will be readily determined from the discussion herein.

In one end of the container (a portion thereof which is here designated as the cleaning chamber) there is disposed a mass of absorbent substance 12 which is preferably in the form of fibrous material such as felt. One reason for preferring the round tubular form of container is that the absorbent material may be more readily caused to assume a form which is peculiarly adaptable to the purposes of this invention. A pad of fibrous material, such as felt, (see Fig. 5) is cut or scored along lines 13 and 14 and the edges parallel to the cuts 13 and 14 are rounded or cut off to conform to the shape illustrated here. The whole pad is then folded upon itself along a line parallel to and about midway between the cuts 13 and 14, whereupon the mass of absorbent substance is inserted into the cleaning chamber.

The end of the cleaning chamber remote from the partition 11 is provided with a cover 15 mounted on the wall of container 10 by means of hinge 16. The hinge 16 is preferably provided with a spring 17 which tends to force the cover open. A spring catch 18 is mounted in the container wall in such manner as to engage an opening 19 in the cover 15 in order to retain the said cover in normally closed position. It will be readily understood that the catch and the portion of cover 15 cooperating therewith may be of any desired form, for example a depression of the inner surface of cover 15 may be substituted for the catch opening 19 shown in the drawing. Means are provided on the outside of the container for operating the catch 18 to release the cover 15. The release means is preferably in the shape of a button 20 projecting through the wall of container 10 to a sufficient distance as to be readily operated by the pressure of the finger of the operator.

Within that portion of the container 10 designated as the lighting chamber there is disposed a flashlight assembly of conventional design. One or more dry cells 21 are placed in series and connected by conductors 22 to an incandescent electric light bulb in the end of the container. In one embodiment of the invention a reflector and lens are associated with the light bulb. According to another embodiment of the invention the bulb 23 is of small size and positioned in an opening of a metallic cap 24 on the end of the container. In this latter form of the invention (see Fig. 4), the light circuit is made and broken by rotation of the metallic cap 24. If the more usual form of flashlight assembly using a reflector and lens is employed, a switch is mounted on the outside of the container in the manner well known to the art.

In the use of the present invention, a service station attendant or other person desiring to determine the depth of oil in an automobile motor crank case switches on the light in one end of the container in order to aid him in withdrawing the oil gauge from the engine block. A relatively simple movement of one finger depresses the catch button 20 whereupon the cover 15 flies open under the action of spring 17. It will be seen from Fig. 3 that the absorbent substance 12 is so disposed within the container that there is a V-shaped opening at one edge thereof which facilitates insertion of the oil gauge to the cleaning material. The gauge is pressed down once and withdrawn, cleaning it of oil. The gauge may then be re-inserted into the engine block and withdrawn in order that the depth of oil in the crank case may be determined. It will be noted from Fig. 3 that the pad of absorbent substance actually has more than one slot therethrough that may be used in cleaning an oil gauge. Each of the cuts 13 and 14 forms an additional cleaning slot which may be used when the first slot, caused by folding the pads, becomes saturated with engine oil. After the pad is completely saturated it may be withdrawn and a new pad inserted for further use. A device prepared in accordance with this invention has been used by the inventor in cleaning four hundred successive oil gauges without changing the pad and very good results were obtained over the period of use noted.

It will be understood from the foregoing discussion that the present invention is not concerned with the type of lighting unit disposed in one end of the container but is rather directed to a new and useful device for cleaning oil gauges and other metallic strips and to the combination of such a cleaning device with a lighting unit within a unitary container. It is to be further understood that the present description is directed to a preferred embodiment of the invention and is not intended to be limiting or exhaustive of the invention which is defined in the following claims.

I claim:

1. A device for wiping an oil gauge comprising a cylindrical mass of absorbent substance formed by rolling a rectangular block of the absorbent substance about an axis which is its longest dimension, a cylindrical casing for holding the mass of absorbent substance in cylindrical form, means for closing one end of said container and means for forming a detachable closure for the opposite end thereof, said rectangular block of absorbent substance, before rolling, having chamfered edges adjacent the inner face thereof, said face having slits formed substantially throughout the thickness thereof, that are parallel to each other, spaced from one another and parallel to the chamfered edges, whereby a plurality of longitudinal passageways are formed when the rectangular block of absorbent substance is retained by the cylindrical casing in rolled cylindrical form.

2. A device for wiping an oil gauge comprising a cylindrical mass of absorbent substance, said mass having formed in the periphery thereof and extending longitudinally throughout the length thereof, a V-shaped groove, said mass of absorbent material further having longitudinal closed slits formed therein which when the mass is viewed in cross-section, form a Y, the end of the leg of which joins the inner point of the V-shaped groove, said V-shaped groove and slits forming passageways through which the gauge is passed to wipe it, said passageways and V-shaped groove being formed by a rectangular block of absorbent substance having chamfered parallel edges adjacent one face thereof, said face having slits formed substantially throughout the thickness thereof that are parallel to each other, spaced from one another and parallel to the chamfered edges, and a cylindrical casing adapted to hold the absorbent substance in cylindrical form when rolled about its longitudinal axis to form the cylindrical mass.

FLOYD E. HEATWOLE.